United States Patent
Ebling (10) Patent No.: US 9,715,006 B2
(45) Date of Patent: Jul. 25, 2017

(54) SYSTEM AND METHOD FOR AVOIDING DC BIAS IN A HOMODYNE RECEIVER

(71) Applicant: Ford Global Technologies, LLC, Dearborn, MI (US)

(72) Inventor: James Paul Ebling, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 691 days.

(21) Appl. No.: 14/173,250

(22) Filed: Feb. 5, 2014

(65) Prior Publication Data

US 2015/0219751 A1    Aug. 6, 2015

(51) Int. Cl.
| | |
|---|---|
| *G01S 7/02* | (2006.01) |
| *G01S 7/03* | (2006.01) |
| *G01S 7/35* | (2006.01) |
| *G01S 13/36* | (2006.01) |
| *G01S 13/40* | (2006.01) |
| *G01S 13/93* | (2006.01) |
| *G01S 13/34* | (2006.01) |
| *G01S 13/58* | (2006.01) |

(52) U.S. Cl.
CPC ............... *G01S 7/02* (2013.01); *G01S 7/038* (2013.01); *G01S 7/354* (2013.01); *G01S 13/36* (2013.01); *G01S 13/40* (2013.01); *G01S 13/931* (2013.01); *G01S 13/343* (2013.01); *G01S 13/584* (2013.01); *G01S 2007/358* (2013.01)

(58) Field of Classification Search
CPC ........ G01S 13/343; G01S 13/36; G01S 13/40; G01S 13/584; G01S 13/931; G01S 2007/358; G01S 7/02; G01S 7/038; G01S 7/354
USPC ........................................................ 342/175
See application file for complete search history.

(56) References Cited

U.S. PATENT DOCUMENTS

| | | | |
|---|---|---|---|
| 3,422,430 A | 1/1969 | Rittenbach | |
| 4,682,175 A * | 7/1987 | Lazarus | ........... G01S 7/038 342/122 |
| 4,860,014 A * | 8/1989 | Shores | ........... G01S 13/325 342/105 |
| 5,929,802 A | 7/1999 | Russell et al. | |
| 2012/0242538 A1 | 9/2012 | Hasch et al. | |
| 2013/0106648 A1 | 5/2013 | White et al. | |

* cited by examiner

*Primary Examiner* — Timothy A Brainard
(74) *Attorney, Agent, or Firm* — Frank MacKenzie; Brooks Kushman P.C.

(57) ABSTRACT

A homodyne radar system includes a mixer that outputs a signal having a mixer output frequency that is a frequency difference between two input signals. When the frequency difference is small, low frequency noise may mask the actual signal. A variable phase shifter is added to one of the mixer inputs to change the phase at a predetermined rate of change. The phase shifter shifts the frequency of the input signal so that the mixer output frequency is offset by the predetermined rate. The low frequencies are mapped to frequencies that are above the noise frequencies. The phase shift may be achieved by adding a constant phase at predetermined time intervals. The sampling frequency for the resulting signal may need to be increased to accommodate the higher frequencies.

20 Claims, 4 Drawing Sheets

SYSTEM AND METHOD FOR AVOIDING DC BIAS IN A HOMODYNE RECEIVER

TECHNICAL FIELD

This application generally relates to avoiding low frequency noise in a radar system.

BACKGROUND

A radar system may be utilized for many purposes in an automotive vehicle. For example, a radar system enables safety features such as collision warning and adaptive cruise control. The effectiveness of such systems may depend upon the performance of the radar system. A radar operates by transmitting an electromagnetic wave that is reflected from an object back to a radar receiver. The reflected signal may be shifted in frequency from the transmitted signal. The radar electronics, using a mixer, may generate a signal that is the difference in frequency between the transmitted and received signals. This frequency difference may then be processed to calculate the range and relative velocity of the object.

A homodyne receiver may down-convert a radar signal directly to a baseband frequency without first converting the signal to any intermediate frequencies. Non-moving (no Doppler content) returns from zero or near-zero range may result in DC or near-DC frequency signals in the baseband. High-level leakage and noise signals and the frequency spread due to oscillator phase noise may mask the DC and low-frequency (near-range) returns.

The noise resulting from the homodyne down-conversion process may be primarily a DC bias noise, sometimes referred to as mixer bias. The bias contributes to noise referred to as $1/f$, $1/f^2$, and $1/f^3$ noise. This noise, in addition to inherent device noise in the case of $1/f^n$ components, may be the result of equal, or nearly equal, frequency components reacting in the down-conversion mixer and the phase noise of the signals themselves. Leakage of the local oscillator (LO) and radio-frequency (RF) signals may self-mix to DC. The leakage may also reflect off the mixer ports internally due to imperfect matching.

The transmit-to-receive antenna isolation may be greater than 50 dB and radar return signals may be greater than 50 dB below transmit levels. The leakage in the mixer itself may be approximately 20-25 dB below the oscillator signal levels. In automotive radars, the oscillator signal level to the homodyne mixer may only be 3-5 dB below the transmit signal level. Near range target return levels are limited by the $R^4$ roll-off dictated by the radar range equation. In addition, the radar cross section (RCS) of the targets may be physically limited by the illumination of the antenna, which may be a very small spot at near range. Thus, the leakage signals in the mixer may dominate the returns of near range targets with low RCS that have little or no relative motion.

Pedestrians may have a small RCS and low Doppler content. At near range, a return signal from a pedestrian may be masked by the mixer bias noise. In stop-and-go situations, a radar instrumented vehicle may be following a target vehicle to a stop. Issues may arise when the target vehicle exhibits a low RCS (e.g., motorcycles, certain cars). As the vehicle approaches the target vehicle and reduces speed, the target vehicle return may become masked by mixer bias. The result may be reduced performance of functions that rely on the radar system to detect objects.

SUMMARY

A homodyne receiver includes a mixer configured to receive a first input signal based on a transmitted signal and a second input signal based on a received signal and a phase shifter configured to apply a predetermined rate of phase change to one of the first input signal and the second input signal, wherein a mixer output frequency is shifted by the predetermined rate. The phase shifter may be configured to provide the predetermined rate of phase change to the first input signal. The homodyne receiver may include a coupler configured to couple the transmitted signal to the first input signal and the phase shifter may be configured to provide the predetermined rate of phase change to the first input signal. The phase shifter may be configured to provide the predetermined rate of phase change to the second input signal. The homodyne receiver may include a low noise amplifier configured to process the received signal and output the second input signal and the phase shifter may be configured to provide the predetermined rate of phase change to the second input signal. The predetermined rate of phase change may be a predetermined constant value. The homodyne receiver may include at least one controller configured to sample a mixer output amplitude, wherein a sampling frequency for the mixer output amplitude may be greater than a highest expected mixer output frequency.

A method of avoiding DC bias noise in a homodyne receiver includes changing phase of a first input signal to a mixer at a predetermined rate, mixing the first input signal and a second input signal to the mixer, and outputting a signal with a frequency that is shifted by the predetermined rate such that a mixer output amplitude is above a corresponding noise amplitude. Changing the phase of the first input signal may include adding a constant phase to the first input signal at predetermined time intervals. The predetermined rate may be a predetermined constant value. The first input signal may be based on a transmitted signal. The first input signal may be based on a received signal.

A radar system includes an oscillator configured to generate a transmitted signal, an antenna configured to transmit the transmitted signal and receive a received signal, and a homodyne receiver including a mixer configured to mix a first input signal based on the transmitted signal and a second input signal based on the received signal and a phase shifter configured to apply a predetermined rate of phase change to one of the first input signal and the second input signal, wherein a mixer output frequency is shifted by the predetermined rate of phase change. The radar system may include at least one controller configured to sample the mixer output amplitude, wherein a sampling frequency for the mixer output amplitude is greater than a highest expected mixer output frequency. The predetermined rate of phase change may be selected such that a mixer output amplitude is above a corresponding noise amplitude at a base frequency. The predetermined rate of phase change may be a predetermined constant value. The phase shifter may be configured to apply the predetermined rate of phase change to the first input signal by adding a constant phase to the first input signal at predetermined time intervals. The homodyne receiver may be configured to apply the predetermined rate of phase change to the first input signal. The homodyne receiver may be configured to apply the predetermined rate of phase change to the second input signal. The radar system may include a coupler configured to provide the transmitted signal to the antenna and provide a coupled output based on the transmitted signal, and wherein the first input signal may be the coupled output.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
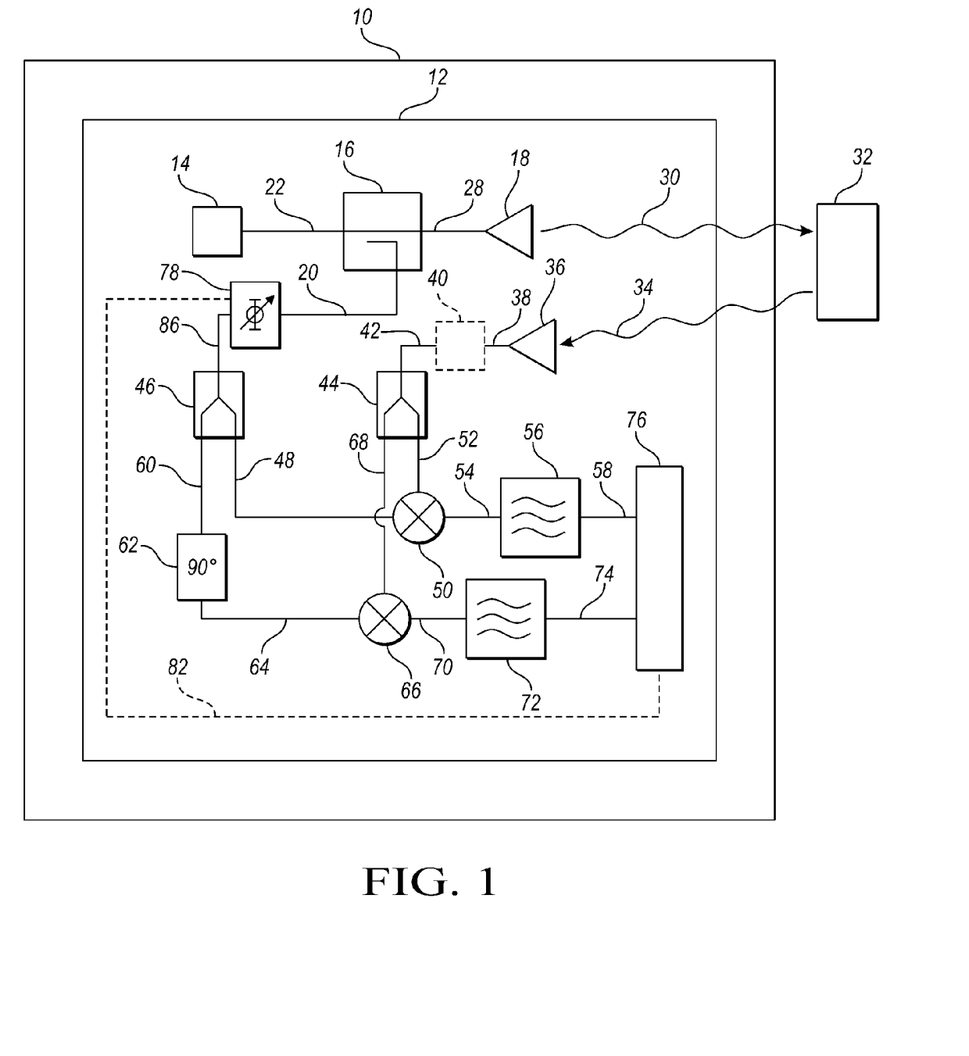
FIG. 1 is a diagram of a vehicle including an improved homodyne radar system.

FIG. 1 shows an example block diagram of a homodyne Linear Frequency Modulated (LFM) radar system 12 in a vehicle 10. A homodyne radar system 12 may be configured to directly down-convert a signal frequency to zero intermediate frequency. A radar system 12 may generate an electromagnetic wave 30 having a frequency and amplitude. A Voltage Controlled Oscillator (VCO) 14 may be configured to output a chirp signal 22. The VCO 14 may include an amplifier to provide a chirp signal 22 at an appropriate power level for transmission. The chirp signal 22 may be a signal that varies in frequency over time. The VCO 14 may generate a chirp signal 22 that varies linearly with time, such as $f(t)=f_0+\gamma t$. The frequency of the chirp signal 22 may repeat over a fixed range of frequencies. The frequency of the chirp signal 22 may also be selected such that the frequency repeatedly increases and decreases linearly within a frequency range. The range of frequencies may be denoted as the bandwidth (BW) and may be equal to the difference between the highest and lowest frequencies swept by the chirp signal 22. The VCO frequency output 22 may be fed to a coupler 16. The coupler 16 may allow a main transmit signal 28 to pass through to a transmit antenna 18. The coupler 16 may pass a majority of the signal energy to the transmit antenna 18. The coupler 16 may also provide a coupled signal 20 that is indicative of the frequency and amplitude of the main transmit signal 28. The coupled signal 20 may resemble the main transmit signal 28 in terms of frequency for use in the radar receiver circuit. The main transmit signal 28 may be routed to a transmit antenna 18.

The transmitted chirp signal 28 may be converted by the transmit antenna 18 to an electromagnetic wave 30. The transmitted wave 30 may be of the form $$s(t)=A_t \cos(2\pi(f_0 t+\gamma t^2)) \quad (1)$$

where $f_0$ is a frequency of the chirp signal 22, $\gamma$ is equal to a chirp rate that may be defined as the ratio of the pulse bandwidth (BW) over the pulse length of the transmitter ($T_p$).

The transmitted electromagnetic wave 30 may travel out from the antenna 18 and may be reflected when striking an object 32 located a distance R from the radar unit 12 and traveling at a velocity $\upsilon$ relative to the radar unit 12. There may be multiple objects 32 located at different distances from the vehicle and traveling at different speeds relative to the vehicle. When striking the object 32, the electromagnetic wave 30 may be reflected back to the radar unit 12. The reflected wave 34 may be received by a receive antenna 36. Although the transmit antenna 18 and the receive antenna 36 are shown as separate antennas, a single antenna may be utilized for both purposes. The reflected waveform 34 may have different amplitude, frequency and phase than the transmitted wave 30. The reflected wave 34 may be of the form:

$$s(t+\tau)=A_r \cos\{2\pi[f_0(t+\tau)+\gamma(t+\tau)^2+2\upsilon/cf_0(t+\tau)]\} \quad (2)$$

where c is the speed of light, and $\tau$ is the propagation delay of the signal and is equal to $2R/c$.

The reflected wave 34 may be converted to an electrical signal 38 by the receive antenna 36. The received signal 38 may be passed through a low noise amplifier (LNA) 40 to increase the amplitude of the received signal. The amplifier 40 may provide an amplified receive signal 42. The amplified received signal 42 may be routed through a received signal power divider 44 to split the received signal for use in different parts of the circuit.

The coupled signal 20 may be passed to an input of a variable phase shifter 78. The phase shifter 78 may be configured to apply a periodic phase shift to the transmit-based input signal 20. The output signal 86 of the phase shifter 78 may be routed through a reference power divider 46 to split the reference frequency for different parts of the circuit. A first output 48 of the reference power divider 46 may be routed to an input of a mixer 50. One output 52 of the received signal power divider 44 may be routed to a second input of the mixer 50. The receive-based signal 52 may have a different frequency than the reference signal 48 due to the speed and distance of the object 32 from the radar system 12. The mixer 50 may remove the frequency of the reference signal 48 from the received signal 52. In the frequency domain, the frequency of the reference signal 48 may be subtracted from the frequency of the received signal 52. An output 54 of the mixer 50 may be routed through a filter 56. The filter 56 may be a low pass filter to remove higher frequency components from the mixer output 54. A final in-phase output signal 58 may have a frequency based on the speed and range of the object 32 that reflected the wave.

In some applications, a second output 60 of the reference power divider 46 may be routed through a constant phase shifter 62 that shifts the phase of the transmit-based signal 60 by a constant 90 degrees. The constant phase shifted reference signal 64 may be routed to an input of a second mixer 66. An output 68 of the received signal power divider 44 may be routed to an input of the second mixer 66. The second mixer 66 may remove the frequency of the phase-shifted reference signal 64 from the received signal 68. A second mixer output 70 may be routed through a filter 72. The filter 72 may be low pass filter. This configuration generates a quadrature data output 74 that is 90 degrees out of phase with the in-phase output signal 58.

The in-phase signal 58 and quadrature signal 74 may be routed to a controller 76. The controller 76 may include one or more analog to digital converters to sample the signals. The sampled signals may be processed to ascertain the amplitude and frequency content of the signals. The processed signals may be used to calculate the range and relative velocity of the object 32. The range and relative velocity data may be used to perform collision warning (CW) functions that may warn the driver when a collision with an object is possible. Additionally, the CW function may command the brake system to apply brake pressure to slow the vehicle to avoid a collision. The processed signals may also be used for adaptive cruise control (ACC) functions that control the vehicle speed according to the distance between the object and the relative speed of the object. The ACC function may control the propulsion torque and braking system to maintain a desired distance and/or speed. For example, when ACC is active, the system may first attempt to control the vehicle speed to a desired set speed. When a slower moving object is detected in front of the vehicle the system may control the vehicle speed so as to maintain a set distance between the object and the vehicle. As the object in front slows, the vehicle may be slowed to maintain the separation distance. If the object stops, the vehicle may be stopped as well.

Prior art homodyne radar systems do not include the variable phase shifter 78. Prior art homodyne systems may connect the coupled transmit signal 20 directly to the input of the reference power divider 46.

Figure 2:
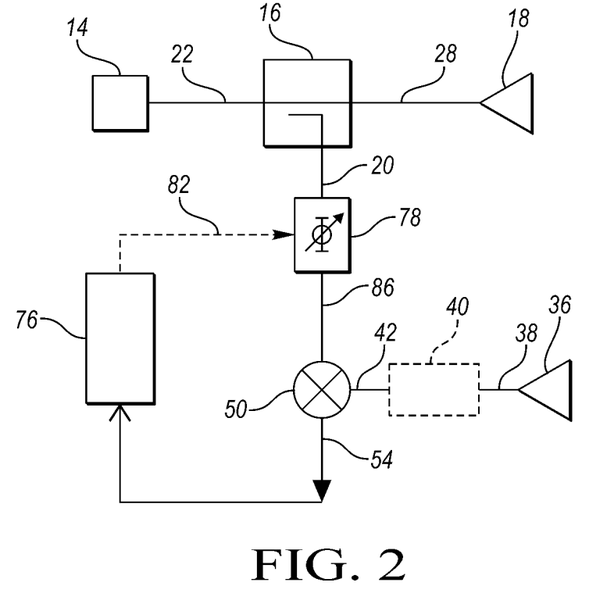
FIG. 2 is a diagram illustrating a possible configuration for a homodyne radar system including a variable phase shifter in line with the transmit signal.

FIG. 2 depicts a simplified example of a homodyne radar system in which a phase shifter 78 is introduced into the coupled transmit-based signal path 20 in the homodyne architecture. FIG. 2 depicts only the in-phase portion of the homodyne radar system but the following discussion may apply to the quadrature portion as well. The phase shifter 78 may also be placed in the transmit antenna path after coupling off the de-chirp signal but this placement may cause intolerable attenuation to the transmit signal. The phase shifter 78 may be configured to apply a periodic phase shift to the transmit-based input signal 20.

The periodic phase shift may be selected to be linear with the phase shifting being imparted at a given sample rate. The sample rate may correspond to an associated A/D converter sampling frequency. Frequency is related to the rate of change or time derivative of phase ($d\phi/dt$). A constant frequency offset may be introduced into a signal by changing the phase of the signal at a constant rate (e.g., $d\phi/dt=K$, where K is constant). This may be accomplished by periodically applying a constant phase adjustment to the signal. The frequency offset may be calculated as $\Delta\phi*f/(2\pi)$ where $\Delta\phi$ is the constant phase adjustment in radians and f is the frequency at which the phase is adjusted. As an example, the constant phase addition may be selected to be $n\pi/2$. Note that any value may be chosen for the constant phase addition and the analysis will be similar. The constant rate may be selected as a sampling rate or frequency, $f_s$. The frequency offset may then be calculated as $nf_s/4$.

The frequency of the input signal 20 may be shifted by configuring the phase shifter 78 to provide a predetermined rate of phase change to the input signal 20. The frequency offset is related to the rate of phase change. Therefore, by adding a constant phase change at predetermined time intervals (e.g., a sampling frequency of the unshifted mixer output signal), a constant frequency offset may be achieved. The frequency offset may be selected such that the amplitude of the mixer output signal 54 is greater than a corresponding noise amplitude at a given frequency.

For example, by selecting a periodic phase shift to be $\pi/2$ (i.e., at each sample time, $\pi/2$ radians are added to the signal path), the frequency offset imparted may be one-fourth of the sample frequency, $f_s$. Other values of differential phase shift may be utilized resulting in different offset frequencies. In addition, the rate at which the phase is added may be adjusted to other values. The resulting frequency shift in the baseband signal may require an increase in an A/D converter sampling frequency of the controller 76 to ensure that the high frequency end of the band may be adequately sampled.

In this example, after the transmit signal 20 is passed through the variable phase shifter 78, the frequency of the output signal 86 may be $f+f_s/4$, where f is the oscillator frequency. In the absence of the variable phase shifter, the frequency of signal 86 would be the oscillator signal 22 frequency, f. Using the variable phase shifter, the local oscillator signal 20 may be shifted in frequency by a frequency of $f_s/4$. The frequency of the mixer output 54 may then be calculated as $f_s/4+\Delta f$, where $\Delta f$ is the frequency difference between the transmitted signal and the reflected signal. A controller 76 may be configured to sample the output 54 of the mixer 50. The controller 76 may also be configured to adjust the phase of the phase shifter. The controller 76 may provide an output 82 that may be the phase adjustment for the phase shifter 78. The output 82 may be updated at a particular frequency to provide a constant rate of phase change. The phase shifter 78 may be analog or digital. The controller 76 may be configured to provide an output 82 that is a variable voltage to control an analog phase shifter. The controller 76 may be configured to output 82 a digital signal or signals to control a digital phase shifter.

The radar return signals may be replicas of the transmitted signal in frequency space with receive-time delay and amplitude differences. The homodyne de-chirping process provides a difference between the transmit signal frequency and the return signal frequency in frequency space. The delay of the return signal encodes the range to a target into a constant frequency. The band of interest is dependent on the chirp rate, the maximum range of interest, and the maximum Doppler frequency expected. Non-moving (no Doppler content) returns from zero or near-zero range may result in DC or near-DC frequency signals in the baseband (i.e., zero intermediate frequency). High-level leakage and noise signals and frequency spread due to oscillator phase noise may mask the DC and low-frequency (near-range) returns.

Figure 4:
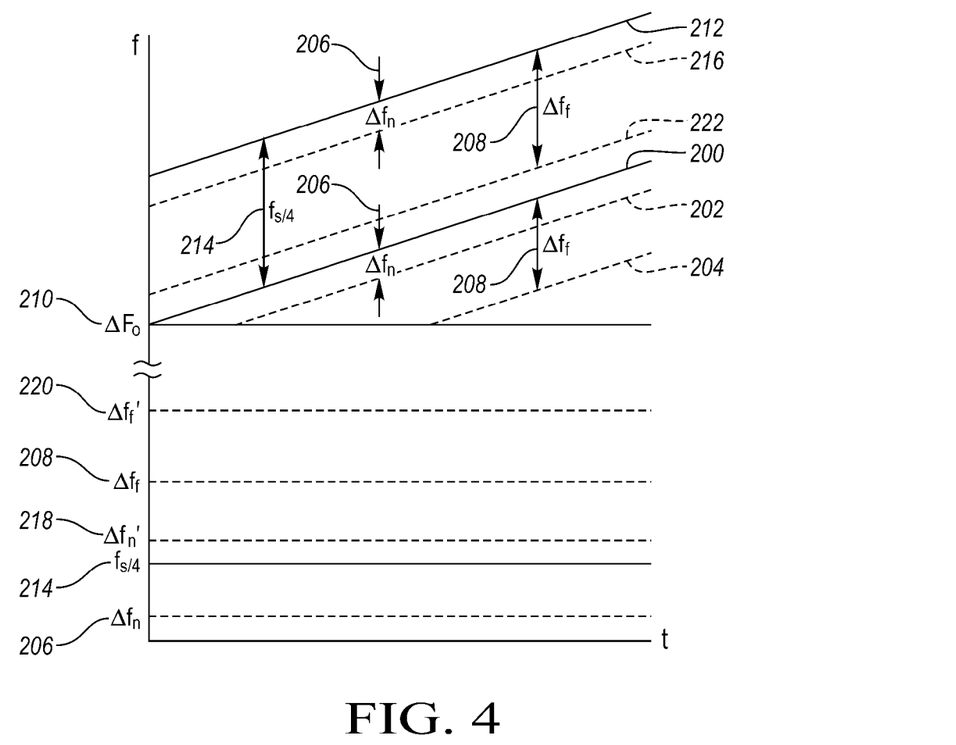
FIG. 4 is a diagram illustrating frequency versus time characteristics for a homodyne radar system and a homodyne radar system including a variable phase shifter.

FIG. 4 provides an example of a near-range and a far-range frequency return signal for homodyne radar system. The frequencies of the transmitted and received signals may be plotted as a function of time. The frequency output of the transmitter may vary linearly with time. The transmitted frequency may be depicted over time as a line 200 starting from a base value, $F_O$ 210, and rising linearly. A return signal for a near-range object 202 may resemble the frequency characteristic of the original signal 200 but may have a frequency offset of $\Delta f_n$ 206 from the transmitted signal 200 at a given time. A return signal for a far-range object 204 may resemble the frequency characteristic of the transmitted signal 200 but have a frequency offset of $\Delta f_f$ 208 from the transmitted signal 200 at a given time. Notice that the near-202 and far-range 204 return signal frequencies may vary linearly with time in the same manner as the transmitted signal 200 frequency.

The output of the variable phase shifter (78 FIG. 1) may be represented by a shifted base frequency curve 212. The frequency may be offset by a constant frequency $f_s/4$ 214 from the transmitted signal 200. A near-range signal 202 that is offset by $\Delta f_n$ 206 from the transmitted signal 200 may result in a phase shifter output frequency profile 216 that is offset from the shifted base frequency profile 212 by $\Delta f_n$ 206 at a given time. When down converted, the final output frequency may be $\Delta f_n{}'$ 218 which may be the sum of the offset frequency $f_s/4$ 214 and $\Delta f_n$ 206. A far-range signal 204 that is offset by $\Delta f_f$ 208 from the transmitted signal 200 may result in a frequency profile 222 that is offset from the shifted base frequency profile 212 by $\Delta f_f$ 208 at a given time. After down conversion, the final output frequency may be $\Delta f_f{}'$ 220 which may be the sum of the offset frequency $f_s/4$ 214 and $\Delta f_f$ 208. Note that without the variable phase shifter, the down converted frequency is $\Delta f_n$ 206 for the near-range frequency and $\Delta f_f$ 208 for the far-range frequency.

Figure 5:
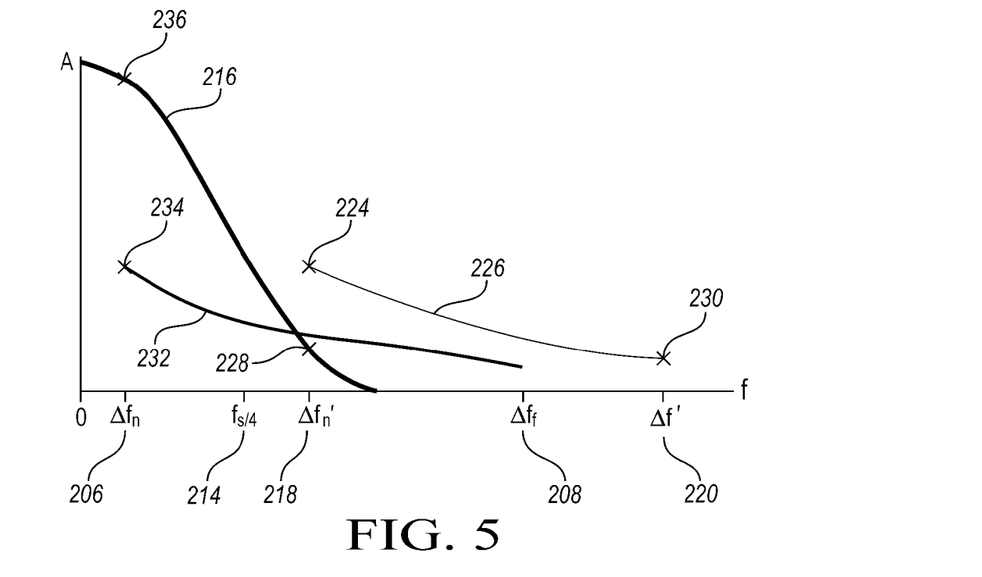
FIG. 5 is a diagram illustrating amplitude versus frequency characteristics for a homodyne radar system and a homodyne radar system including a phase shifter.

FIG. 5 depicts the amplitude of the frequency components. The amplitudes of the frequency components of the converted return signals may be plotted as a function of frequency. A DC noise amplitude 216 may also be plotted as a function of frequency. The DC noise amplitude 216 may be present over a relatively low range of frequencies. An amplitude profile of a prior art homodyne receiver 232 is depicted. In addition, an amplitude profile of the homodyne receiver with variable phase shifters 226 is shown.

For the prior art amplitude profile 232, it is readily observed that at a near-range frequency $\Delta f_n$ 206, the amplitude of the received signal 234 may be less than an amplitude of the noise 236. In the range in which the DC noise bias amplitude 216 is greater than the return signal amplitude 232, target returns may not be distinguishable from the noise. In this low range of frequencies, it may not be possible to distinguish between actual return signals and noise. Hence, the performance of the radar system at detecting near-range objects may be limited. At higher frequencies that are above the DC noise bias amplitude, such as $\Delta f_f$ 208, the amplitude may not be impacted by the low frequency noise.

The amplitude profile of the improved homodyne receiver 226 resolves this issue by shifting the amplitude profile of the return signals without shifting the DC characteristics. The amplitude 226 of the output frequency components of the phase shifted return signals may be plotted as a function of frequency. The phase-shifted output for a near-range signal may be offset to a frequency of $\Delta f_n{}'$ 218 which may be the sum of the offset frequency $f_s/4$ 214 and $\Delta f_n$ 206. The magnitude of the phase-shifted output signal 224 at the offset frequency $\Delta f_n{}'$ 218 may be greater than the amplitude of the DC noise 228 at the same frequency. The far-range frequency 230 may be likewise shifted and may remain above the DC noise at the frequency $\Delta f_f{}'$ 220. Zero range returns may now be mapped to $f_s/4$ 214 in the frequency space.

Figure 3:
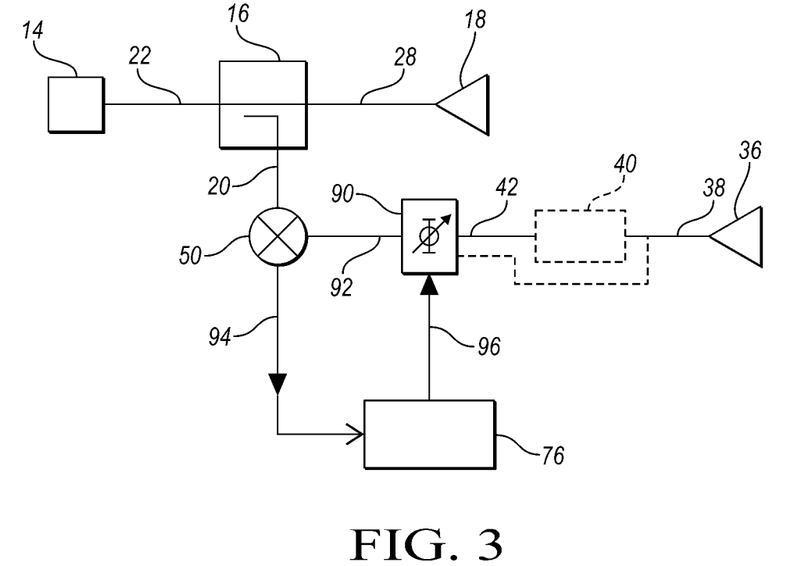
FIG. 3 is a diagram illustrating a possible configuration for a homodyne radar system including a variable phase shifter in line with the received signal.

FIG. 3 depicts an alternative configuration in which a variable phase shifter 90 is alternatively placed in the receive antenna path 38. The input to the phase shifter 90 may be an output of a low noise amplifier 40. In the absence of a low noise amplifier 40, the received signal 38 from the antenna may be input into the phase shifter 90. Placing the phase shifter 90 after the low noise amplifier (LNA) 40 may negatively impact the system noise figure. A similar analysis may be performed as above with similar resulting waveforms.

The addition of the variable phase shifter to the homodyne receiver system provides a benefit in that the amplitudes of the signals may now be above the amplitude of low-frequency noise. This may permit better detection of near-range objects that as the shifted return signals may be distinguishable from the noise. The addition of the variable phase shifter allows the homodyne architecture to be maintained without having to resort to more complex and expensive heterodyne receiver designs.

Since the expected frequency range has been shifted, it may be desired to modify the sampling rate of the resulting signal. As an example, assume that the original sampling frequency is 5/4 times the highest expected frequency in the original homodyne architecture. The highest expected frequency in the original architecture may be $\Delta f_f$ and a sampling frequency $5\Delta f_f/4$ may be chosen in order to adequately sample the complex returns. Assume that a sequential phase shift of $n\pi/2$ will be added to the transmit-based signal using the phase shifter. As discussed, the frequencies will be shifted by a predetermined amount. The sampling frequency of the new signal may need to be increased in order to accommodate the increased frequencies.

A new sampling frequency, $f_{sn}$, for the frequency shifted baseband signals of 1.5 times the original sampling frequency, $f_s$, may be selected. This choice moves the frequency of the nearest range target signal up by 0.375 times $(\Delta f_n + f_{sn}/4 = \Delta f_n + 3f_s/8)$ the original sampling frequency. Assuming that the nearest range signal is at 0 Hz, then the lowest frequency is moved to 0.375 times the original sampling frequency. The effect may be to raise the lowest frequency of interest out of the DC noise range.

The highest frequency of interest in the baseband target signal spectrum is also shifted up by 0.375 times the original sampling frequency. The highest frequency maps to 47/60 times the new sampling frequency, $f_{sn}$. The new sampling frequency, $f_{sn}$, is more than 1.25 times the highest frequency in the complex spectrum of interest so the spectrum may be adequately sampled.

Referring again to FIG. 2, the phase may be adjusted at the new sampling frequency, $f_{sn}$. The controller 76 may sample the mixer output signals 54 at the new sampling frequency. In addition, the controller 76 may apply the phase adjustment 82 to the phase shifter 78 at the same frequency. Similarly, in FIG. 3, the controller 76 may be configured to read the mixer output 94 and provide a signal 96 to the phase shifter 90 to adjust the phase.

The configuration described introduces a phase shifter 78 configured to apply a rate of phase change to the signal. The rate of phase change creates a frequency offset to the signal. The quadrature leg of FIG. 1 also depicts an additional phase shifter 92. This phase shifter 62 is present to provide a quadrature output that is shifted by ninety degrees of phase from the non-shifted signal. The result of adding a fixed phase to a signal is a signal of the same frequency that is delayed or advanced in phase from the original. The phase shifter 62 is configured to apply a fixed phase offset to the signal and does not shift the frequency of the signal. The phase shifter 78 is configured to apply a rate of phase change that effectively changes the frequency of the signal.

Figure 6:
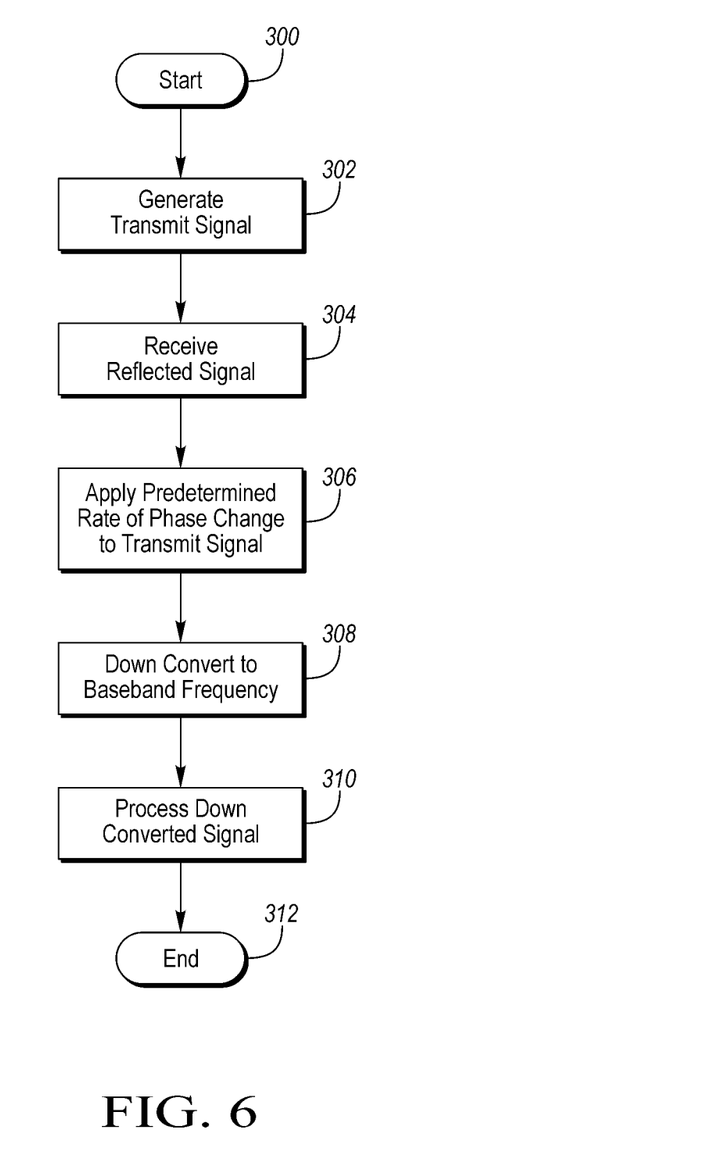
FIG. 6 is a flow chart illustrating a method for avoiding DC noise bias in a homodyne radar system.

FIG. 6 illustrates a flowchart for the operation of the homodyne radar system. The system may begin operation 300 based on a system power-up or ignition on. The radar may generate the transmit signal 302. After the signal is transmitted, a reflected signal may be received. The radar system may receive and filter the reflected signal 304. The filtering may include amplification of the received signal. A predetermined rate of phase change may be applied to the transmit-based signal 306. The effect of applying a rate of phase change may be to shift the frequencies of the mixed signals above DC noise. The system may then down convert the signals to baseband frequencies 308. A controller may then process the down converted signal 310 to calculate the range and velocities of objects in the radar path. The system may repeat or when shut-down conditions are satisfied, operation may terminate 312. The above sequence may be implemented via a combination of hardware circuitry and a microprocessor-based controller.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A homodyne receiver comprising:
a mixer configured to receive a first input signal based on a transmitted signal and a second input signal based on a received signal;
a phase shifter configured to apply a phase change to one of the first input signal and the second input signal; and
a controller configured to, at a sampling frequency, sample a mixer output amplitude and adjust the phase change to achieve a predetermined phase change rate.

2. The homodyne receiver of claim 1 wherein the phase shifter is configured to provide the phase change to the first input signal.

3. The homodyne receiver of claim 1 further comprising a coupler configured to couple the transmitted signal to the first input signal, and wherein the phase shifter is configured to provide the phase change to the first input signal.

4. The homodyne receiver of claim 1 wherein the phase shifter is configured to provide phase change to the second input signal.

5. The homodyne receiver of claim 1 further comprising a low noise amplifier configured to process the received signal and output the second input signal, wherein the phase shifter is configured to provide the phase change to the second input signal.

6. The homodyne receiver of claim 1 wherein the predetermined phase change rate is a predetermined constant value.

7. The homodyne receiver of claim 1 wherein the sampling frequency is greater than a highest expected mixer output frequency.

8. A method of avoiding DC bias noise in a homodyne receiver comprising:
changing phase of a first input signal to a mixer at a predetermined frequency;
mixing the first input signal and a second input signal to the mixer such that a mixer output signal has a frequency that is shifted by a predetermined rate; and
sampling a mixer output signal at the predetermined frequency.

9. The method of claim 8 wherein changing phase of the first input signal includes adding a constant phase to the first input signal at the predetermined frequency.

10. The method of claim 8 wherein the predetermined rate is a predetermined constant value.

11. The method of claim 8 wherein the first input signal is based on a transmitted signal.

12. The method of claim 8 wherein the first input signal is based on a received signal.

13. A radar system comprising:
an oscillator configured to generate a transmitted signal;
an antenna configured to transmit the transmitted signal and receive a received signal;
a homodyne receiver including a mixer configured to mix a first input signal based on the transmitted signal and a second input signal based on the received signal and a phase shifter configured to apply a phase change to one of the first input signal and the second input signal; and
a controller configured to, at a sampling frequency, sample a mixer output amplitude and adjust the phase change to achieve a predetermined phase change rate.

14. The radar system of claim 13 wherein the sampling frequency is greater than a highest expected mixer output frequency.

15. The radar system of claim 13 wherein the predetermined phase change rate is selected such that the mixer output amplitude is above a corresponding noise amplitude at a base frequency.

16. The radar system of claim 13 wherein the predetermined phase change rate is a predetermined constant value.

17. The radar system of claim 13 wherein the phase shifter is configured to apply the phase change to the first input signal by adding a constant phase to the first input signal at the sampling frequency.

18. The radar system of claim 13 wherein the homodyne receiver is configured to apply the phase change to the first input signal.

19. The radar system of claim 13 wherein the homodyne receiver is configured to apply the phase change to the second input signal.

20. The radar system of claim 13 further comprising a coupler configured to provide the transmitted signal to the antenna and provide a coupled output based on the transmitted signal, and wherein the first input signal is the coupled output.

\* \* \* \* \*